Sept. 30, 1941.   D. B. GRABLE   2,257,337
DENTAL AMALGAMATOR
Filed Nov. 4, 1939
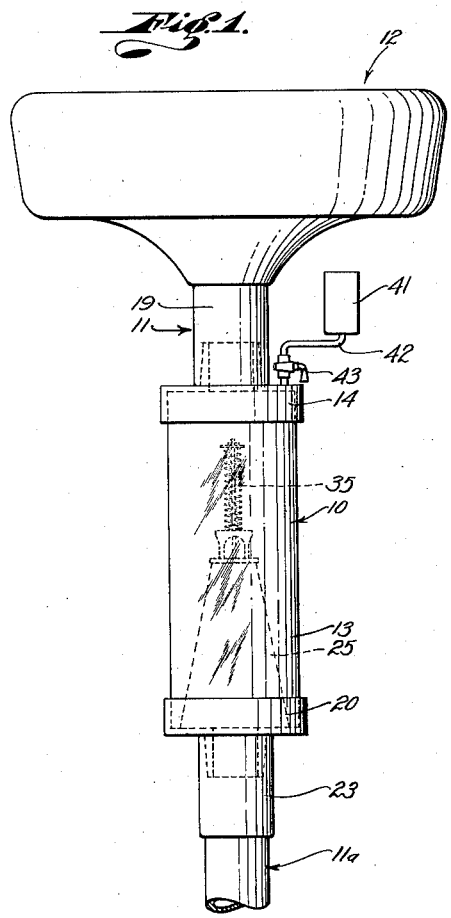
Fig. 1.
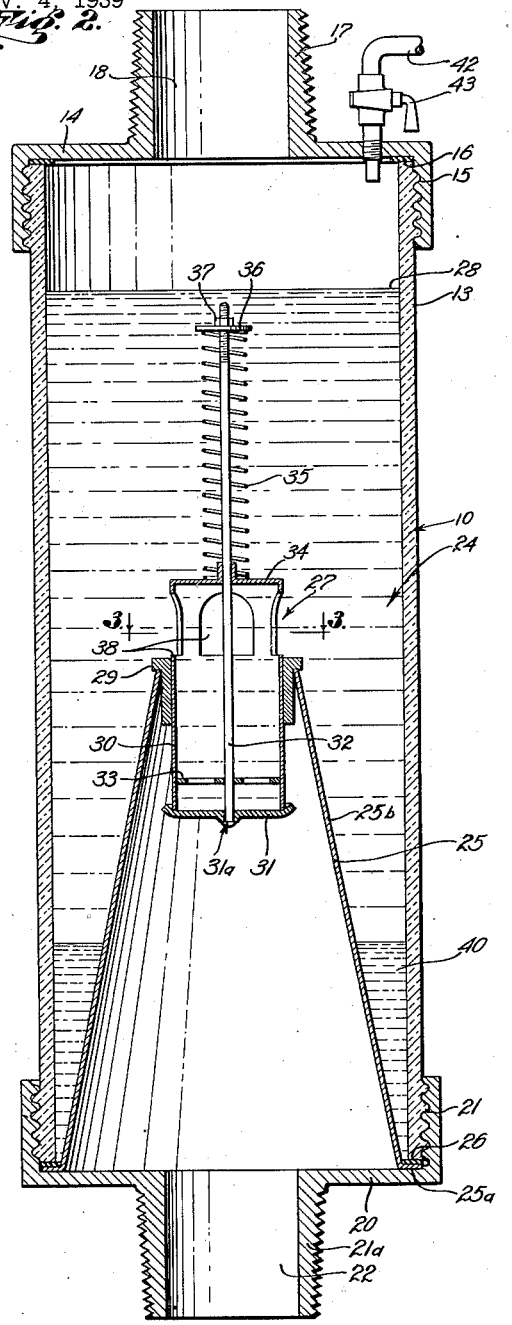
Fig. 2.
Fig. 3.
Inventor
DONOVAN B. GRABLE
K. Calvin White
Attorney Patented Sept. 30, 1941

2,257,337

UNITED STATES PATENT OFFICE 2,257,337

DENTAL AMALGAMATOR

Donovan B. Grable, Long Beach, Calif.

Application November 4, 1939, Serial No. 302,888

8 Claims. (Cl. 209—201)

This invention has to do with amalgamators adapted to be connected in the drain pipes of dental cuspidors or the like for the purpose of trapping and recovering gold and other precious metals that may be carried in the washings from the cuspidor, reference hereinafter being made typically to gold as the metal to be recovered. My primary and general object is to improve in various respects amalgamators heretofore proposed for this purpose, that appear to have had certain defects materially limiting their adaptability and efficiency.

It is known that washings from a dental cuspidor may carry quantities of gold that at least over a period of time are of considerable value. A large part of such gold, however, is apt to be in the form of small sized particles which, because of their tendency to remain suspended in the washing fluid, are very difficult to separate and recover. My observation of dental amalgamators heretofore proposed indicates that necessarily they have had limited success because of the lack of features and provisions that are required if the finely divided, as well as coarser particles of gold, are to be recovered.

In the first place it is necessary that the amalgamator or trap have adequate settling chamber capacity to produce such reduction in velocity of the wash fluid stream flowing through the device, and to retain the fluid in the settling chamber a sufficient period of time that all the gold particles will be caused to settle out of the fluid and gravitate toward the bottom of the chamber. Then it is also necessary that provision be made for bringing the gold particles in contact with mercury or an amalgamated surface so that as the particles separate from the fluid, they will be retained by the mercury or surface and prevented from again becoming suspended in the fluid. In this same connection, it is also desirable that the particles be retained by the mercury or a mercury coated surface at locations within the settling chamber away from the path of direct flow of fluid within the chamber, to thus maintain the separated particles at locations where there is little or no fluid velocity and therefore no tendency for the particles to again be carried into the fluid stream.

The present device embodies these as well as other features of importance, by providing an enlarged vertically extending settling chamber wherein the flow of velocity is greatly reduced and sufficient volume of the fluid is maintained to permit and assure settling out of the gold. In the lower portion of the chamber, and below the path of direct fluid flow from the inlet to the outlet, a quantity of mercury is maintained to entrap the gold particles that settle out of the fluid. Further provision is made for retaining these particles, by providing within the chamber a mercury or amalgam coated wall, preferably in the form of a frustro-conical tube, positioned concentrically within the chamber with its wall sloping downwardly and outwardly so that the settling gold particles are required to contact either the mercury coated surface of the wall or body of mercury in the base of the chamber.

The present form of amalgamator has other structural characteristics of practical importance by reason of the adaptability of the device and easy installation in the drain pipe of the cuspidor. In its preferred form the device comprises a tubular body having upper and lower end closures containing the fluid inlet and outlet, respectively, and formed with threaded coupling sections permitting ready connection with complementary coupling sections in the drain pipe. And as will further appear, the device is so constructed as to be easily disassembled for the purpose of removal of the mercury and parts retaining the entrapped gold.

These as well as additional features and objects of the invention will be understood more clearly and to best advantage, from the following detailed description of an amalgamator taken to represent the invention in a typical form. Reference is had throughout the description to the drawing in which:

Fig. 1 is a general view showing the amalgamator connected to the drain pipe dental cuspidor;

Fig. 2 is an enlarged sectional view of the amalgamator; and

Fig. 3 is an enlarged section on line 3—3 of Fig. 2.

Referring to the drawing, the amalgamator generally indicated at 10, is shown in Fig. 1 to be connected in the drain pipe 11 of a dental cuspidor 12 so that the washings from the cuspidor drain into the amalgamator wherein they are temporarily retained for precipitation of gold, and then discharged into the lower section 11a of the drain pipe. As illustrated in Fig. 2, the body of the amalgamator 10 comprises a tube 13 of sufficiently large diameter to maintain the desired reduction of fluid velocity therein, and which may be made of any suitable material, although generally I prefer to use a glass tube in order that the contents may be inspected without opening the body. The upper end of tube 13 is closed by a cap 14 having at 15 a threaded or other suitable form of attachment to the tube, with a gasket 16 inserted to prevent fluid leakage. The cap 14 has integrally formed therewith a tubular coupling section 17 forming the fluid inlet 18, and consisting preferably of pin section adapted to be threaded into the box section of a coupling or union 19 in the drain pipe 11. The lower end of tube 13 similarly is closed by a cap 20 threaded on the tube at 21 and having a thread pin joint section 21a containing the fluid outlet 22 and adapted to be threaded into the drain pipe coupling or union 23.

Tube 13 contains a vertically elongated settling chamber 24 containing a tubular frustro-conical metallic wall or shell 25 positioned concentrically within the chamber, the bottom flange 25a of wall 25 being clamped between cap 20 and a gasket 26 bearing against the lower end of tube 13. The flow of fluid from the inlet 18 to the outlet 22 is controlled by a valve assembly 27 supported within the upper end of the frustro-conical wall 25 and operating normally to maintain the fluid in chamber 24 at a predetermined elevated level, as for example at 28. The valve assembly 27 may be of a spring-loaded type, comprising a bushing 29 tightly inserted in the upper end of wall 25 and supporting a tubular cage 30 that is expanded or otherwise snugly retained within the bushing. The lower end of cage forms a seat for a valve 31, the stem 32 of which extends upwardly through a spider or guide 33 and through the top 34 of the cage 30. As shown, the valve is dished at its peripheral portion that engages the seat and has a loose connection at 31a with the stem 32 so that should one side of the valve be prevented from seating by a small particle of solid material such as dental cement, the other side of the valve will however engage the seat, thereby preventing dumping of the fluid column and restricting the flow past the valve to the extent that the valve will open when the fluid column exceeds its normal level, and cause said solid particle to become washed away. Whatever leakage occurs through the connection 31a is insufficient to lower the fluid column below its intended level. The valve 31 is urged in a closing direction by a coil spring 35 confined between the top 34 of the cage and a washer 36, the latter being adjustable to vary the spring compression by turning nut 37. As will be apparent, valve 31 controls the discharge of fluid from chamber 24 through openings 38 to the outlet 22.

Coil spring 35 is adjusted to cause the valve 31 to maintain the liquid in chamber 24 at a suitable level 28 above the over-flow level (that of opening 38), at which the liquid otherwise would drain from the chamber in the absence of the valve. In this manner the valve operates to maintain within the chamber a sufficiently large volume of the washings received from the cuspidor, that the liquid will be required to remain in the chamber a length of time necessary for complete settling or precipitation of all suspended gold particles. And as previously observed, the diameter of chamber 24 is made sufficiently large to avoid fluid velocities that would result in the gold particles being carried through the device. The gold particles settle within chamber 24 below the fluid outlets 38, into contact with the outer surface 25b of wall 25, which has a mercury or amalgam coating that effectively retains all gold particles coming in contact with it. Other particles may settle into a body 40 of mercury in the bottom of chamber 24, and thus become effectively trapped. It will be noted that both surface 25b and the body 40 of mercury are located below the fluid outlets 38, and therefore below the path of direct fluid flow through the device, so that there is little or no velocity at the mercury surface or the surface 25b, and thus no tendency for the gold particles, once trapped, to again be swept into the fluid stream. Also by reason of the slope and vertical extent of wall 25, there is presented, together with the mercury 40, a gold retaining surface across the entire area between the upper end of the wall and tube 13, the total area of this surface being sufficient to accommodate and insure retention of all gold particles that may be precipitated from the fluid.

In order to bring about more complete precipitation of the gold, it may be desirable to introduce to chamber 24 a suitable alkalizing reagent or solution that will tend to neutralize the saliva content of the fluid and thereby so reduce its surface tension as to more freely liberate the gold. Such alkali or alkaline solution may be maintained in or introduced to chamber 24 in any suitable manner. As illustrative, a solution of a hydroxide or salt of an alkali earth metal may be introduced from a container 41 through line 42 extending through the top closure 14 of the body. Line 42 may contain a cock or valve 43 so that the alkaline solution may be introduced to the chamber only at such times as gold may be going into the cuspidor 12, and then in only such small quantity as may be necessary to neutralize the acidity of the washings.

By reason of the surface 25b and body of mercury 40 being positioned in the lower part of the chamber 24, the latter may be flushed without undue disturbance of any accumulated gold particles. By directing a rapid flow of water down through the device, valve 31 will open to permit circulation from the inlet 18 to the outlet passages 38 that flushes chamber 24 and removes accumulated bodies contained in the liquid standing above the gold retaining surfaces.

It is to be understood that the drawing is to be regarded merely as typical and illustrative, and that various changes and modifications may be made without departure from the intended scope and spirit of the invention.

I claim:

1. An amalgamator comprising a vertically extending tubular body adapted to be connected in the drain pipe of a dental cuspidor, said body having a fluid inlet at its upper end and an axially alined outlet at its lower end, a mercury containing chamber in said body and communicable with said inlet and outlet, and a valve controlling the flow of fluid from said chamber to the outlet and operated by the downward pressure of liquid above the valve to maintain the fluid in said chamber at a predetermined level above the mercury therein.

2. An amalgamator comprising a vertically extending tubular body adapted to be connected in the drain pipe of a dental cuspidor, said body having at its upper and lower ends axially alined threaded coupling sections forming a fluid inlet and outlet respectively, a mercury containing chamber in said body and communicable with said inlet and outlet, and a valve controlling the flow of fluid from said chamber to the outlet and operated by the downward pressure of liquid above the valve to maintain the fluid in said chamber at a predetermined level above the mercury therein.

3. An amalgamator comprising a vertically extending tubular body adapted to be connected in the drain pipe of a dental cuspidor, said body having a fluid inlet at its upper end and an outlet at its lower end, a tubular wall within said body directly above said outlet and spaced from the wall of the body to form a mercury containing chamber communicable with said inlet and communicable with the outlet downwardly through said tubular wall, and valve means within said body operating automatically to control the downward flow of fluid through said wall to maintain the fluid in said chamber at a predetermined level above said tubular wall.

4. An amalgamator comprising a vertically extending tubular body adapted to be connected in the drain pipe of a dental cuspidor, said body having a fluid inlet at its upper end and an outlet at its lower end, an upwardly tapered frustro-conical wall positioned concentrically within said body above said outlet and spaced from the wall of the body to form a mercury containing chamber communicable with said inlet and communicable with the outlet through said tubular wall, and valve means applied to the upper portion of said wall and operating to maintain the fluid in said chamber at a predetermined level above the said wall.

5. An amalgamator comprising a vertically extending tubular body adapted to be connected in the drain pipe of a dental cuspidor, said body having a fluid inlet at its upper end and an outlet at its lower end, a tubular wall within said body above said outlet and spaced from the wall of the body to form a mercury containing chamber communicable with said inlet and communicable with the outlet through said tubular wall, and means comprising a spring-loaded valve supported by said tubular wall for maintaining the fluid in said chamber at a predetermined level above the mercury therein.

6. An amalgamator comprising a vertically extending tubular body adapted to be connected in the drain pipe of a dental cuspidor, said body having a fluid inlet at its upper end and an outlet at its lower end, an upwardly tapered frustro-conical wall positioned concentrically within said body above said outlet and spaced from the wall of the body to form a mercury containing chamber communicable with said inlet and communicable with the outlet through said tubular wall, and means comprising an upwardly seating spring-loaded valve supported by the upper portion of said tubular wall for maintaining the fluid in said chamber at a predetermined level above the mercury therein.

7. An amalgamator comprising a vertically extending tubular body adapted to be connected in the drain pipe of a dental cuspidor, said body comprising an intermediate tubular section, upper and lower caps forming a fluid inlet and an outlet, respectively, threadedly connected to said tubular sections and each including a threaded coupling section, an upwardly tapered frustro-conical wall within said body and spaced from the wall thereof to form a mercury containing chamber communicable with said inlet and communicable with the outlet through said frustro-conical wall, and means including a spring-loaded valve in the upper interior of the last mentioned wall for maintaining the fluid in said chamber at a predetermined level above the mercury therein.

8. An amalgamator comprising a vertically extending tubular body adapted to be connected in the drain pipe of a dental cuspidor, said body having a fluid inlet at its upper end and an outlet at its lower end, a tubular wall within said body above said outlet and spaced from the wall of the body to form a mercury containing chamber communicable with said inlet and communicable with the outlet through said tubular wall, and means for maintaining the fluid in said chamber at a predetermined level above the mercury therein, said means comprising a valve seat within said wall, a valve engageable with said seat, and a spring-loaded valve stem, said valve being connected with said stem to permit disengagement of one side of the valve from the seat, with the other side of the valve remaining in engagement therewith.

DONOVAN B. GRABLE.